United States Patent [19]

Cecil

[11] Patent Number: 4,757,615
[45] Date of Patent: Jul. 19, 1988

[54] LEVEL VIAL RETAINING ASSEMBLY AND RETAINER THEREFOR

[75] Inventor: Norbert J. Cecil, Burlington, Conn.

[73] Assignee: The Stanley Works, New Britain, Conn.

[21] Appl. No.: 25,679

[22] Filed: Mar. 13, 1987

[51] Int. Cl.⁴ .......................... G01C 9/24; F16B 21/18
[52] U.S. Cl. ..................... 33/379; 411/519; 411/521; 403/326
[58] Field of Search ............... 411/162–164, 411/352, 353, 508, 517–519, 521, 544, 999; 403/326; 33/379, 381, 384

[56] References Cited

U.S. PATENT DOCUMENTS

| | | | |
|---|---|---|---|
| 253,886 | 2/1882 | Over | 411/163 |
| 523,021 | 7/1894 | Traut | 33/384 |
| 1,749,600 | 3/1930 | Olson | 411/163 |
| 2,582,580 | 1/1952 | Bedford . | |
| 2,615,759 | 10/1952 | Becker | 301/112 |
| 2,670,226 | 2/1954 | Becker | 287/20 |
| 2,712,262 | 7/1955 | Knohl | 411/521 |
| 2,752,693 | 7/1956 | Wullschleger | 33/211 |
| 2,798,748 | 7/1957 | Maurer | 287/52 |
| 2,922,669 | 1/1960 | Hansen | 411/544 |
| 2,976,046 | 3/1961 | McCullough, Jr. | 33/379 |
| 3,007,726 | 3/1959 | Parkin | 287/53 |
| 3,320,846 | 5/1967 | Orain . | |
| 3,491,454 | 2/1967 | Wright | 33/211 |
| 3,842,514 | 10/1974 | Scheyer | 33/379 |
| 4,543,988 | 10/1985 | Huveteau | 137/542 |

OTHER PUBLICATIONS

Waldes Truare Retaining Rings brochure, Waldes Kohinoor, Inc.

Primary Examiner—Neill R. Wilson
Attorney, Agent, or Firm—Chilton, Alix & Van Kirk

[57] ABSTRACT

A vial retaining assembly for a level or like object employs a retainer member for securing the vial in a mounting receptacle of the level. The retainer member comprises a first set of generally radially extending ears which frictionally engage the wall which defines the receptacle. A second set of radially extending ears forcefully engages the end of the vial to secure the vial in fixed relationship within the receptacle.

12 Claims, 2 Drawing Sheets

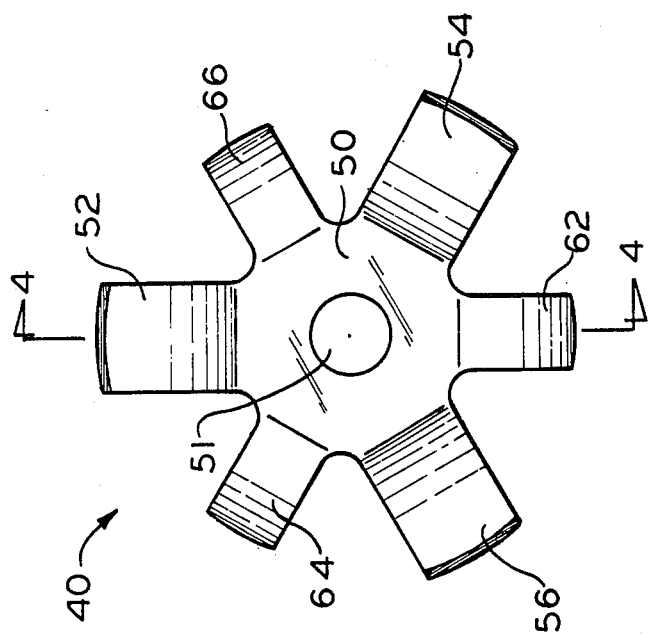
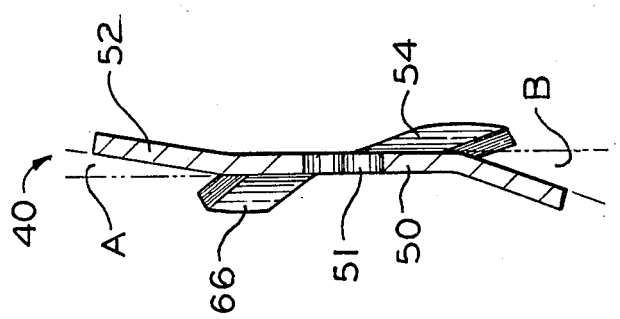

LEVEL VIAL RETAINING ASSEMBLY AND RETAINER THEREFOR

BACKGROUND OF THE INVENTION

This invention relates generally to retainer elements employed for securing objects in fixed relationship within a recess or receptacle. More particularly, the present invention relates to means for securing a vial of a level in a vial retaining recess.

Bubble vials are conventionally mounted in tools and instruments which incorporate a level indicator to thereby provide an efficient level indicating means. Cylindrical receiving recesses or receptacles are commonly formed in the body of the instrument for receiving the vial. The vial conventionally has a generally cylindrical exterior shape and is dimensioned to be closely received in the recess or receptacle. The vial is conventionally secured in fixed position by cementing the vial in position, filling the end of the receptacle with a hot melt adhesive, or otherwise closing one or more ends of the receiving receptacle. While the foregoing processes have proved satisfactory for securing the vial in position, the use of a mechanical retainer member presents certain advantages in term of assembly efficiency, aesthetics and quality control.

There are a multitude of mechanical fastener devices having a star-like, radially protruding ear configuration and which are adapted for securing an object in fixed position to a mounting structure. Parkin U.S. Pat. No. 3,007,726 discloses a fastening device which employs two series of resilient integral tongues. One series of the tongues extends toward a central aperture while the second series extends outwardly away from the aperture. The outer tongues are specifically adapted for engagement with the internal wall of a cavity to prevent withdrawal of the device from the cavity. The inner series of tongues is adapted to bite into a rod, such as an umbrella stick, which is inserted through the aperture.

Orain U.S. Pat. No. 3,320,846 employs a device having a quasi W-shaped cross-sectional configuration which includes a plurality of angularly spaced resilient arms which are inclined to the plane perpendicular to the axis of the device. The arms have sharp edges which cut into a bore defining surface when the retention device is rotated.

Maurer U.S. Pat. No. 2,798,748 discloses an annular clamping disc which has a single set of substantially identical spoke-like portions having a central rectangular slot. The clamping disc is adapted to engage an outer member for receiving a shaft. The disc functions as a key for non-rotatably securing elements to a rotary shaft.

Becker U.S. Pat. No. 2,670,226 discloses a fastening device which employs axially spaced sets of tongues and teeth. The support engaging tongues seat against the bottom of an opening so that the tongues engage the wall of the opening to retain the fastener in the opening. A second set of teeth is disposed at a second end of a hollow body portion. The teeth are inclined to facilitate engagement of the tongues with a tubular member so that the series of tongues engages the wall of an opening in a support and the other series of teeth is adapted to cooperatively interiorly engage the end of the tubular member which is inserted into the opening.

None of the noted patents disclose a retainer member which employs dual sets of ears wherein one set engages the wall of a receptacle to retain the retainer member in position and the other set resiliently engages an end of the object to be secured in position within the receptacle.

SUMMARY OF THE INVENTION

Briefly stated, the invention in a preferred form is a vial retaining assembly which employs a mechanical retainer member having a star-like configuration. The retainer member comprises a central connecting hub which defines the center. A first set of angularly spaced resilient ears integrally extend from the hub in a generally radial direction. The ears terminate substantially equidistantly from the center of the hub. The ears are directionally oriented at a uniform first acute angle with respect to the hub. A second set of angularly spaced resilient ears integrally extends from the hub in a generally radial direction. The ears of the second set terminate substantially equidistantly from the center of the hub. The second distance is less than the first distance. The second set of ears is directionally oriented at a generally uniform second acute angle with respect to the hub. The second acute angle is unequal to the first acute angle. In a preferred embodiment, the ears of the first set are interposed between ears of the second set in alternating angularly spaced relationship. The ears are generally equiangularly spaced. There are preferably three ears in each of the first and second sets. The first acute angles are directionally opposite the second acute angle.

A level which incorporates a preferred application of the invention comprises a main body which forms a wall defining a generally cylindrical shaped retaining receptacle. The receptacle has a shoulder at a first end and is opened at the second end. A bubble vial having axially spaced first and second ends is axially received in the receptacle with the first vial end abuttably engaging the shoulder. A retainer member is positioned in the receptacle for securing the vial in fixed position in the receptacle. The retainer member comprises a first set of angularly spaced resilient ears which integrally extend from a hub and are slightly angularly inclined toward the receptacle open end. The ears are dimensioned and biased so that the terminal ends of the ears frictionally engage the wall defining the receptacle to resist displacement of the retainer member toward the receptacle second end. A second set of angularly spaced ears integrally extends from the hub. The second ears are angularly biased into engagement with the vial second end to force the vial against the shoulder thereby securing the vial and the retainer member in fixed position in the receptacle. The retainer member is configured so as to be insertable in the receptacle and displaceable in an axial direction toward the shoulder or closed end of the receptacle but resistant to axial displacement toward the open end of the receptacle.

A method in accordance with the present invention secures an object of a type having spaced ends in fixed relationship with a body which defines a generally cylindrical retainer receptacle having an open and a closed end. The object is axially inserted into the receptacle so that one object end abuttably engages the shoulder. A retainer member having two sets of resilient ears is inserted into the receptacle through the open end and axially displaced toward the closed end. One set of ears of the retainer member is forced against the other object end and the other set of ears is forced into frictional engagement with the receptacle defining portions of the body for axial retention of the member and the object at a fixed position of the receptacle.

An object of the invention is to provide a new and improved assembly and method for securing a bubble vial in a fixed position in a vial retaining receptacle.

Another object of the invention is to provide a new and improved mechanical retainer member for efficiently securing a vial in a fixed position to the body of a level tool or instrument.

A further object of the invention is to provide a new and improved retainer member of inexpensive and efficient construction which may be relatively easily inserted into the end of a receptacle and forced against the end of a bubble vial to retain the bubble vial in a fixed secure position.

Other objects and advantages of the invention will become apparent from the specification and the drawings.

BRIEF DESCRIPTION OF THE DRAWINGS

FIG. 3 is an enlarged side elevational view of the retainer member employed in the assembly of FIG. 1; and FIG. 4 is a sectional view of the retainer member taken along the line 4—4 of FIG. 3, said view further illustrating angular structural relationships of the retainer member.

DETAILED DESCRIPTION OF THE INVENTION

Figure 1:
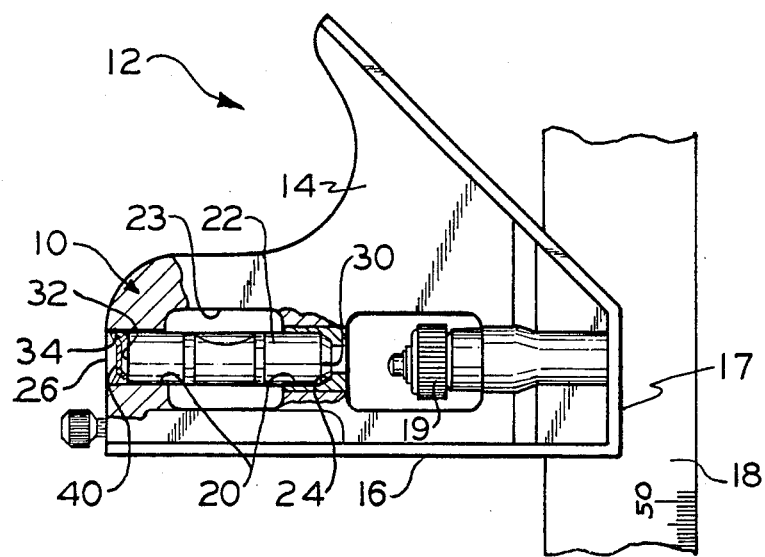
FIG. 1 is a side elevational view, partly broken away and partly in section, of a combination level square illustrating the vial retaining assembly and retainer member therefor of the present invention.
Figure 2:
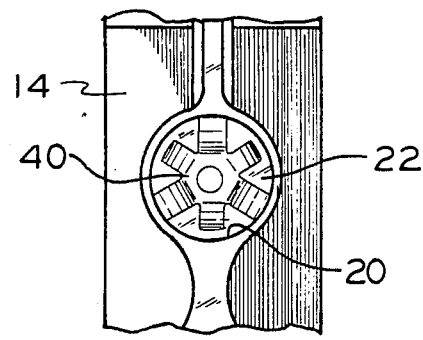
FIG. 2 is an enlarged fragmentary end view of the combination level square of FIG. 1.

With reference to the drawings wherein like numerals represent like parts throughout the figures, a vial retaining assembly in accordance with the present invention is generally designated by the numeral 10. The vial retaining assembly 10 is illustrated in a preferred application in conjunction with a combination level square 12. The level square 12 comprises a metal body 14 which forms two perpendicular intersecting reference edges 16 and 17. A linear measuring rule 18 is received in a forward slot of the body 14 and secured by a clamping nut 19. The rule 18 is disposed in perpendicular relationship to reference edge 16 and parallel relationship to reference edge 17.

The body also forms a segmented generally cylindrical receiving receptacle 20 for closely receiving a bubble vial 22 for mounting the vial to the body. A window 23 is formed in the body 14 between the segmented portions of the receptacle 20 to facilitate viewing of the bubble vial 22. The bubble vial 22 is of conventional generally cylindrical form employed for visually indicating a level or non-level condition. Receptacle 20 is oriented in parallel axial disposition relative to reference edge 16. The forward end of the mounting receptacle is closed or traversed by a tapered shoulder 24. The rear end 26 is generally opened prior to the assembly and securing of the vial 22.

The bubble vial 22 has a forward end 30 and an axially spaced rear end 32. The forward end 30 abuts against shoulder 24. The rear segment of the receptacle 20 is defined by a cylindrical wall 34 which receives the rear portion of the vial. A self-locking retainer member 40, as will be more fully described below and as best illustrated in FIGS. 3 and 4, forcefully abuts against the rear end 32 of the bubble vial and frictionally engages the wall 34 of the receptacle to secure the vial in fixed position to the body 14.

With additional reference to FIGS. 3 and 4, retainer member 40 may be generally described as a star-like washer having two sets of alternating, angularly spaced ears. Retainer member 40 is preferrably formed from spring steel or similar material with the ears being bent to provide a dual spring biased, self-locking and self-centering configuration as will be more fully described below.

Retainer member 40 includes a central hub 50 which constitutes the principal support and connecting structure. A central opening 51 is formed in the hub to facilitate engagement of the retainer member 48 by a tool during the installation process for aligning and positioning the member. As illustrated, the hub 50 is generally planar. In some embodiments (not illustrated) wherein the hub is not generally planar, the hub defines a reference plane.

A first set of substantially identical ears 52, 54 and 56 integrally extend generally radially outwardly from hub 50 at an acute angle A with respect to the plane of the hub. Ears 52, 54 and 56 are equiangularly spaced. Each of ears 52, 54 and 56 have a generally rounded terminus which is equidistantly spaced from the center of the hub 50. The ears 52, 54 and 56 are dimensioned to have a radius which is slightly greater than the corresponding radius of receptacle 20. The acute angle A of inclination is preferably uniform for each of ears 52, 54 and 56. The widths of the ears 52, 54 and 56 are also generally uniform and substantially identical.

In a non-assembled mode of a typical embodiment of member 40, the acute angle A of inclination of the ears 52, 54 and 56 is approximately 10°, the radius of the ears (from the center of the hub) is approximately 0.22 inches and the width of the ears is approximately 0.09 inches. When the retainer member is installed in position as best illustrated in FIG. 1, the retainer member ordinarily undergoes a small degree of deformation and the ears are slightly bent toward the rear end 26 at an acute angle which may be slightly different than angle A.

A second set of ears 62, 64 and 66 integrally extend generally radially outwardly from the hub 50 at a second acute angle B with respect to the plane of the hub. Ears 62, 64 and 66 are equiangular spaced and are disposed in equiangular spaced, alternating fashion with relation to the first set of ears 52, 54 and 56. Ears 62, 64 and 66 are substantially identical. Each of the ears has a rounded terminus. Each terminus is substantially equidistantly spaced from the hub center a distance which is less than the corresponding distance (radius) of the first set of ears.

For the typical embodiment previously described, the acute angle of inclination of ears 62, 64 and 66 is approximately 20° and in an opposite direction in relation to the plane of the central hub from the acute angle of inclination of ears 52, 54 and 56. The ears 62, 64 and 66 of the second set each have a substantially uniform width which is less than that of the corresponding width of the ears of the first set. For the described typical embodiment, the radius (radial distance from the center of the hub to the ear terminus) of ears 62, 64 and 66 is approximately 0.19 inches and the width is approximately 0.062 inches. In the installed mode, the ears ordinarily are bent at an acute angle toward the vial which is slightly less than acute angle B due to the spring-loading characteristic of the retainer as more fully described below.

The retainer member 40 functions to secure the bubble vial 22 in fixed position within the receptacle by means of a cooperative self-locking, spring loaded, fastening mechanism provided by the dual sets of ears. The second set of ears 62, 64 and 66 resiliently engages the rear end 32 of the bubble vial to forcefully urge the vial against the forward shoulder 24. The first set of ears 52, 54 and 56 is correspondingly biased under the reactive load applied against the second set of ears to frictionally grip or bite into the cylindrical wall 34 which defines the rear receptacle cavity (as best illustrated in FIG. 1) to thereby forcefully secure the fastener and the vial in the spring loaded, fixed position. The respective prebent acute angles of inclination of the sets of ears function to bias the ears into the described forced fit, self-locking engagement relationship. In the installed mode, there may be some distortion or deformation of the retainer member from the illustrated symmetric configuration of FIGS. 3 and 4 due to the loaded forced fit type locking engagement.

In accordance with the invention, the vial retaining assembly 10 may be relatively easily accomplished by first inserting the bubble vial 22 into the mounting receptacle 20 from end 26 until the forward end 30 of the bubble vial engages shoulder 24. It should be noted that the shoulder may have a number of forms such as a surface defining a completely closed end. The retainer member 40 is oriented in an upright position such as that of FIG. 4 and then axially inserted into the rear portion 34 of the receptacle. The retainer member need not be oriented at a specific angular orientation for installation. The retainer member is axially forced against the vial rear end 32 until the second set of ears forcefully engages the end of the bubble vial. It will be appreciated that the dual sets of ears are suitably dimensioned and biased due to the described angular relationship to facilitate insertion of the retainer member toward the forward end of the receptacle but to resist counter-displacement toward the rear of the receptacle due to the reactive biased frictional engagement of the terminal portions of ears 52, 54 and 56 with wall 34. The retainer member is forced against the end 32 of the vial so that the reactive forces urging the vial against the second set of ears forces the first set of ears into enhanced biting engagement with the wall 34 which defines the receptacle.

It will be appreciated that retainer member 40 in accordance with the invention may employ alternate configurations which have numbers of ears of each of the sets other than the three which are illustrated and/or which ears are not equiangularly spaced or shaped as described. It is believed that three equiangular spaced projecting ears for each of the sets is the optimum configuration for the illustrated application. It will also be appreciated that retainer member 40 has numerous applications other than in connection with retaining a vial in fixed position to a body as described. In general, a suitably dimensioned retainer member 40 may be employed to forcefully engage against the end of an object of numerous forms and frictionally engage or bite into the surrounding body retaining wall structure for the object to forcefully self-lock the member and object in fixed position with the body.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed:

1. A retainer member comprising:
   a hub defining a center and a reference plane;
   a first set of angularly spaced resilient ears integrally extending outwardly from said hub generally radially thereto and terminating at a substantially uniform first distance from the center of said hub, said ears being directionally oriented at a generally uniform first acute angle with respect to the plane of said hub; and
   a second set of angularly spaced resilient ears integrally extending outwardly from said hub generally radially thereto and terminating at a second distance from the center of said hub, which distance is less than said first distance, said second set of ears being directionally oriented at a generally uniform second acute angle with respect to the plane of said hub, said second acute angle and said first acute angle being on opposite sides of said plane.

2. The retainer member of claim 1 wherein said first set of ears have a substantially uniform width for a substantial extent of said first distance and said second set of ears have a substantially uniform width for a substantial extent of said second distance, said second width being less than said first width.

3. The retainer member of claim 1 wherein ears of said first set are interposed between ears of said second set in alternating angularly-spaced relationship.

4. The retainer member of claim 1 wherein the ears of at least one of the sets are equiangularly spaced.

5. The retainer member of claim 1 wherein the number of ears of said first and second sets is three.

6. The retainer member of claim 1 wherein the first acute angle is less than the opposite second acute angle.

7. The retainer member of claim 1 wherein the hub comprises means defining a central opening.

8. A method for securing an object having spaced ends in fixed relationship with a body defining a retainer receptacle having a first end and an open second end comprising:
   (a) axially inserting said object into said receptacle so that one object end is generally located at the first end of the receptacle;
   (b) axially inserting a retainer member having two sets of resilient ears into said receptacle through said open end and toward said first end;
   (c) forcing the retainer member against the other object end so that one set of ears engages the other object end and the other set of ears is forced into frictional engagement with receptacle defining portions of the body for axial spring-loaded retention of the member and object at a fixed position of the receptacle.

9. The method of claim 8 wherein the steps are performed in the sequence of steps (a), (b), and (c).

10. A level comprising:
    a main body forming a wall defining a retaining receptacle, said receptacle having a first end and an open second end;
    a bubble vial having axially spaced first and second ends axiallly received in said receptacle with said first vial end being generally positioned at said first receptacle end;

retainer means positioned in said receptacle for securing said vial in fixed position in said receptacle comprising:

a hub, a first set of angularly spaced resilient ears integrally extending from said hub and slightly angularly inclined toward said receptacle open end, said ears being dimensioned and biased so that the terminal ends of the ears frictionally engage the wall defining the receptacle to resist displacement of the retainer means toward the receptacle second end, and a second set of angularly spaced ears integrally extending from said hub and angularly biased into engagement with the vial second end thereby securing the vial in fixed spring-loaded position in the receptacle.

11. The level of claim 10 wherein the ears are substantially equiangularly spaced.

12. The level of claim 10 wherein the retainer means is configured so as to be insertable in the receptacle and displaceable in an axial direction toward the first end of the receptacle but resistant to axial displacement toward the open end of the receptacle. frictional engagement with receptacle defining portions of the body for axial spring-loaded retention of the member and object at a fixed position of the receptacle.

* * * * *

UNITED STATES PATENT AND TRADEMARK OFFICE
CERTIFICATE OF CORRECTION

PATENT NO. : 4,757,615

DATED : July 19, 1988

INVENTOR(S) : Norbert J. Cecil

It is certified that error appears in the above-identified patent and that said Letters Patent is hereby corrected as shown below:

Claim 12, lines 5 - 8, delete the phrase, "frictional engagement with receptacle defining portions of the body for axial spring-loaded retention of the member and object at a fixed position of the receptacle."

Signed and Sealed this

Twentieth Day of December, 1988

Attest:

DONALD J. QUIGG

*Attesting Officer*  *Commissioner of Patents and Trademarks*